United States Patent [19]
Nolan

[11] Patent Number: 6,106,202
[45] Date of Patent: Aug. 22, 2000

[54] PNEUMATIC CONVEYING AIR ASSIST LINE WITH AIR BLEED

[75] Inventor: Phillip A. Nolan, Wyoming, Minn.

[73] Assignee: Nol-Tec Systems, Inc., Lino Lakes, Minn.

[21] Appl. No.: 09/072,437

[22] Filed: May 4, 1998

[51] Int. Cl.⁷ .................................................. B65G 53/04
[52] U.S. Cl. ............................. 406/95; 406/93; 406/94; 406/10; 406/50
[58] Field of Search .................. 406/94, 95, 10, 406/50, 12, 14, 11, 145, 146

[56] References Cited

U.S. PATENT DOCUMENTS

| | | | |
|---|---|---|---|
| 3,929,379 | 12/1975 | Krambrock | 302/24 |
| 4,067,622 | 1/1978 | Krambrock et al. | 302/24 |
| 4,515,503 | 5/1985 | Snowdon | 406/11 |
| 4,715,748 | 12/1987 | Krambrock | 406/11 |
| 4,861,200 | 8/1989 | Lübbehusen et al. | 406/14 |
| 4,900,199 | 2/1990 | Spaulding et al. | 406/14 |
| 4,909,676 | 3/1990 | Heep et al. | 406/14 |
| 4,955,761 | 9/1990 | Federhen et al. | 406/12 |
| 5,147,551 | 9/1992 | Averette | 210/640 |
| 5,224,802 | 7/1993 | Federhen et al. | 406/95 |
| 5,240,355 | 8/1993 | Hudalla | 406/95 |
| 5,584,612 | 12/1996 | Nolan | 406/11 |

FOREIGN PATENT DOCUMENTS

| | | |
|---|---|---|
| 58-212526 | 12/1983 | Japan . |
| 61-18635 | 1/1986 | Japan . |
| 2 085 388 | 4/1982 | United Kingdom . |

Primary Examiner—H. Grant Skaggs
Assistant Examiner—Jeffrey Shapiro
Attorney, Agent, or Firm—Westman, Champlin & Kelly, P.A.

[57] ABSTRACT

A pneumatic conveying transport system for bulk materials has a conduit that carries material in a gas flow, and at spaced locations along the conduit air assists are provided to inject a supplemental amount of air into the conveying conduit when back pressure builds up in the conduit at the selected locations. The air assists include air outlet lines connected to provide air into the conveying conduit. A low volume flow source maintains a positive flow of air out of the air outlet lines during pneumatic conveying.

11 Claims, 4 Drawing Sheets

PNEUMATIC CONVEYING AIR ASSIST LINE WITH AIR BLEED

BACKGROUND OF THE INVENTION

The present invention relates to improvement for air assists used for insuring uniform conveying of particulate or powdered material in a dense phase bulk material handling system by providing an air bleed through the air assist inlet line to insure that the air assist will operate satisfactorily.

Dense phase transporter systems with regulated pressure air assists are shown in U.S. Pat. Nos. 5,240,355 and 5,584,612, both owned by the assignee of this application. A dense phase conveying system uses a conveying conduit or line that carries material under fluid pressure from a transport vessel to a receiver bin. At selected intervals along the conduit, nozzles are provided for introducing a flow of air under regulated pressure in transport zones to assist moving the particulate or powdered material along the conduit in each of the zones. This minimizes the size of slug in the line.

In U.S. Pat. No. 5,584,612, the air assists are energized or activated in response to a build up of back pressure sensed downstream from the air assist that is being operated. As back pressure increases a pilot operated valve is opened to introduce the air assist flow to the conduit.

SUMMARY OF THE INVENTION

The present invention is an air assist system for a dense phase bulk material transporter having air assists in the conveying conduit or line to provide air discharge for moving material along the conduit or line. The flow of air in each of the air assists is controlled in response to back pressure at the air assist air outlet line and port in the conduit. Pilot operated pressure regulators are initialized when the system is turned on, and the conveying air flow from each pilot operated pressure regulator is controlled by a pilot operated control valve that will open in response to a build up of back pressure in the air inlet line leading to the conveying conduit. This build up of back pressure is caused by material in the conveying conduit building up so that there is not free flow of the material through the conduit.

In order to insure that the air assist air outlet line and the pressure sense line do not become plugged with the material being conveyed, a small flow of air is provided through the back pressure sensing line so that there is a continuous low flow out of the sensing line and air inlet lines of each of the air assists. When back pressure builds up to about 50% of the pressure at the inlet of the pilot operated control valve, the control valve shifts open allowing regulated air to flow through the control valve and into the air assist air outlet line providing air into the conduit carrying the conveyed materials.

The flow of bleed air is low, so that when material builds up in the material conveying conduit, back pressure will increase in the pilot valve pilot pressure sensing line to cause opening of the pilot operated control valve.

The small bleed flow of air can be provided independently of the pilot operated valve that controls the main flow into the material carrying conduit, if desired. A known pilot operated control valve can be used. In the present invention, an orifice is installed in the pilot operated valve for providing the controlled low flow of bleed air from the pilot pressure sense port into the air assist air outlet line. Such flow could be regulated from any source using appropriate pressure regulators, orifices, and flow control members as desired.

DETAILED DESCRIPTION OF THE PREFERRED EMBODIMENTS

Figure 1:
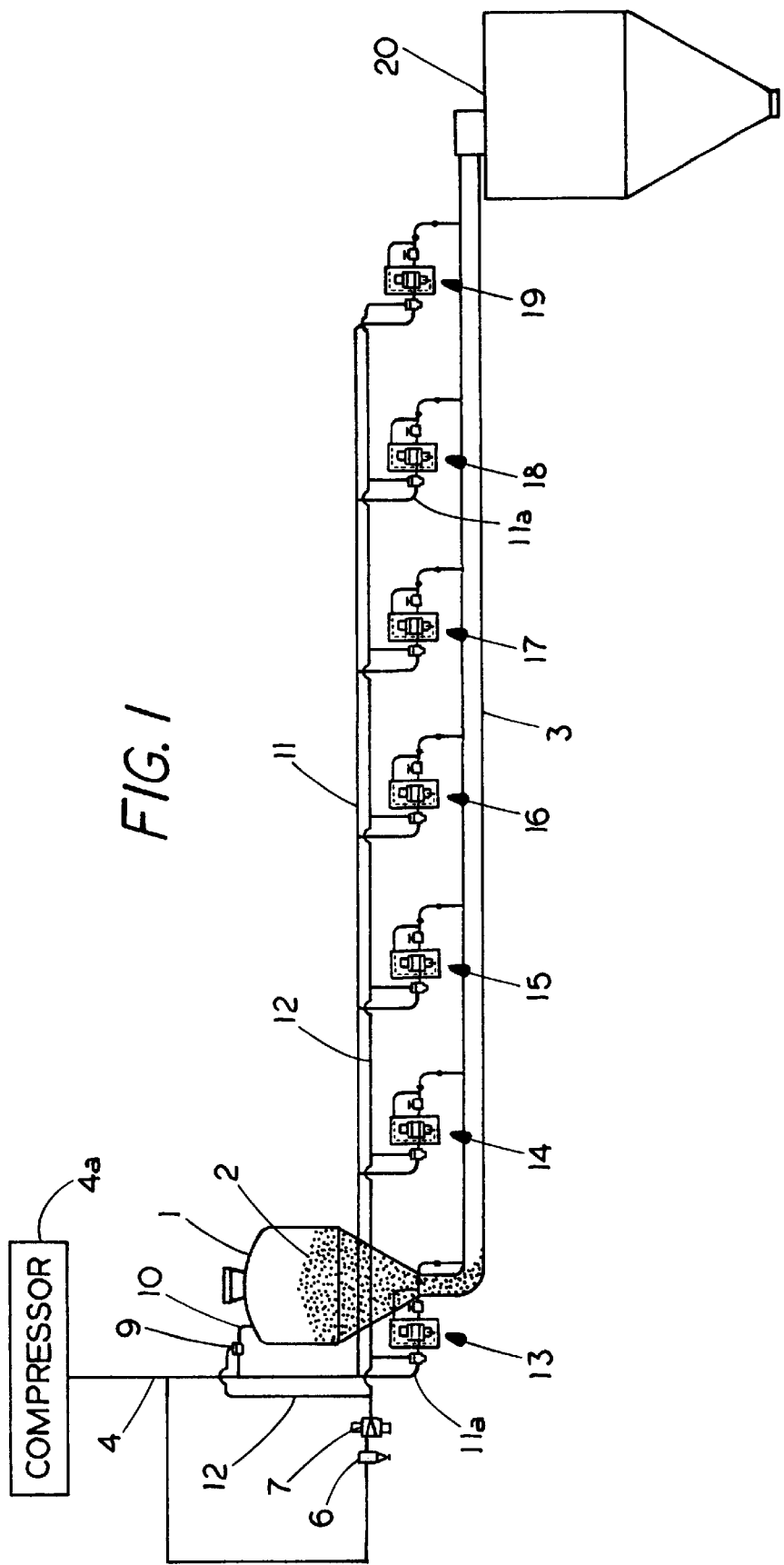
FIG. 1 is a schematic representation of a typical bulk conveying system including a material conveying conduit used for dense phase pneumatic conveying from a source to a receiver.

Referring first to the overall schematic representation of a dense phase pneumatic conveying system shown in FIG. 1, transport vessel 1 holds the material to be conveyed, which is either particulate or powdered. The transport vessel has an outlet connected to a material conveying conduit 3 of suitable size that leads to a material receiving bin 20. Transport vessel 1 is pressurized by air under pressure at an inlet line 10 from a pilot operated air pressure regulator 9. The pilot regulator 9 is activated by a pilot pressure in a pilot pressure line 12 leading from a transport regulator 6 through a three-way valve 7. This overall arrangement is similar to that shown in both U.S. Pat. Nos. 5,240,355 and 5,584,612, except that the air assists of the present invention are provided with a bleed flow through the input air line connected to the conveying conduit.

With the conveying system in a static state, there is a high pressure in the main "plant" air supply conduit 4. The conduit 4 is connected to a compressor 4a of suitable size to supply the air volume needed for the dense phase conveying.

The pilot pressure supply conduit 12 is on the output side of the transport regulator 6, and downstream from the three-way control valve 7. The valve 7 blocks flow from the transport regulator 6 and exhausts the pilot pressure supply conduit 12 of any residual gas when the valve 7 is in an off position. The inlet to the transport regulator is connected to plant air supply conduit 4.

Prior to starting the material conveying cycle, the transport regulator 6 is adjusted to provide the desired pressure to the pilot pressure line 12 and the lines connected thereto during conveying. The regulator 9 is a pilot pressure controlled regulator, as shown, and provides a pressure in the conduit 10 as a function of the pilot pressure in line 12. Conduit 10 is tapped into the main air pressure line 4 so that there is a controlled flow of air or other suitable gas introduced into the transport vessel 1. The maximum adjusted pressure from regulator 9 may not be reached under normal conveying, and the output pressure of the regulator 9 is a function of the input pilot pressure. Thus, adjustment of the transport regulator 6 will control the maximum air pressure supplied to the vessel 1 and conveying conduit 3 through the regulator 9. Also, the adjustment of the transport regulator 6 adjusts the pilot pressure in pilot pressure line 12 which leads to the air assist assemblies shown schematically at 13, 14, 15, 16, 17, 18 and 19.

The conveying system in FIG. 1 is shown at an initialization stage of the conveying cycle. The three-way supply valve 7 opens allowing the regulated gas from the transport regulator 6 to flow into the pilot supply line 12. Gas (air) at the predetermined pressure in the pilot supply line 12 activates the pilot regulator 9 at the top of the transport vessel 1, to pressurize the vessel through the top inlet air line 10. Simultaneously the pressure in the pilot supply line 12 opens pilot operated pressure regulators on the air assists 13–19, initializing the air assists so they are ready to operate, as will be explained.

Each of the air assists 13–19 is controlled as a function of back pressure in the conveying conduit 3, at the particular port where the back pressure is being sensed. Unless there is a sensed back pressure in the conveying line or conduit 3 at the air inlet line from the respective air assists 13–19 to the conduit 3, the air assists are not activated and do not cause a flow of gas or air into the conveying conduit 3.

It should be noted that the pilot pressure actuated pressure regulators will always be open when pilot pressure is present in line 12 to provide a regulated pressure of air through them. The flow of air into the conduit 3 from each of the air assists is controlled by a separate control valve. The compressor 4a provides flow to the main conduit 11 that provides the high pressure air to each of the air assists, through branch lines shown at 11a. Pressure in the conduit 11 is at high pressure, for example 80 psi or more, and is maintained at this pressure under normal operating conditions.

Figure 2:
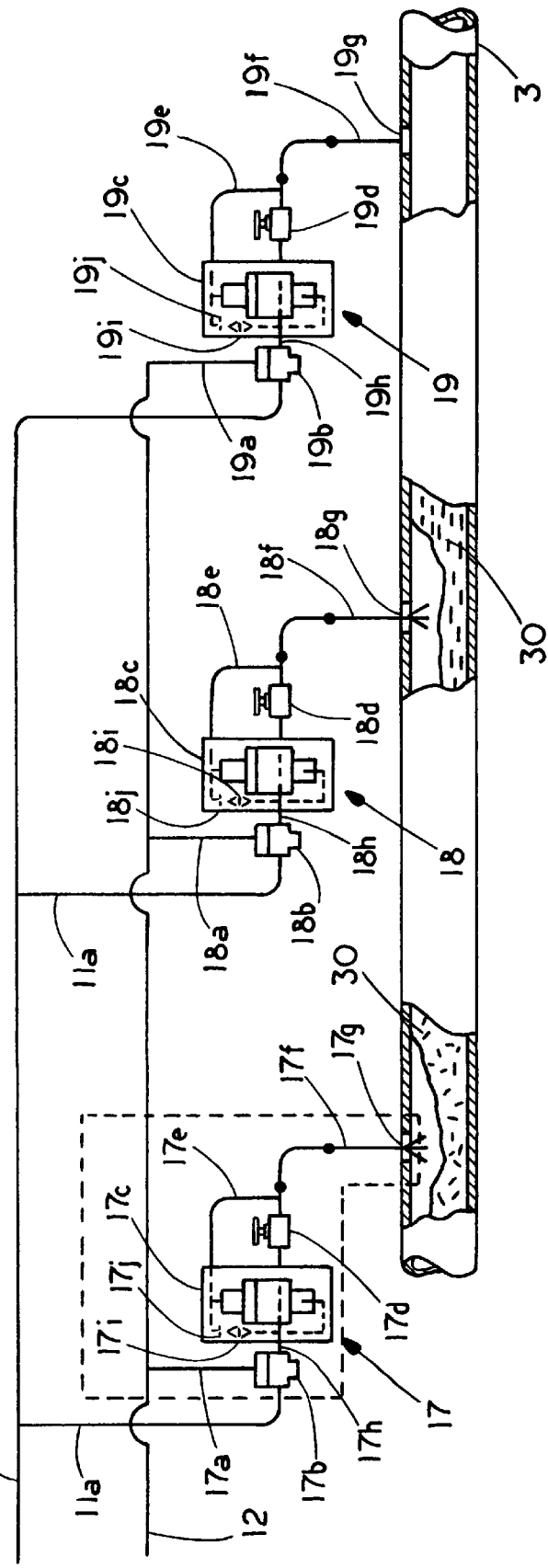
FIG. 2 is a schematic view of a section of a conveying conduit shown in FIG. 1, illustrating air assists made according to the present invention.

Referring now to FIG. 2, typical air assists are illustrated. The air assists shown in FIG. 2 are the air assists 17, 18, and 19. The configuration is the same however for all of the air assists. The air assists 17, 18 and 19 each include a separate pilot operated pressure regulator 17b, 18b and 19b that is connected with branch lines 17a, 18a and 19a to the pilot pressure line 12. Thus, when the pilot pressure is present on line 12, the pilot pressure regulator valves 17b–19b deliver air under regulated pressure from the lines 11a leading to the respective pilot operated regulator, to output lines 17h, 18h and 19h. The output lines 17h–19h carry gas at a regulated pressure that can be anywhere up to the same as the plant line or high pressure line 11. The supply of air is unrestricted. This regulated pressure flow is controlled by individual pilot operated control valves 17c, 18c and 19c (as well as the valves for the other air assists). The pilot operated control valves 17c, 18c and 19c have pilot pressure passageways therein, leading to one end of a shuttle spool. The pilot pressure valves are made so that when the pressure in sensing lines 17e, 18e and 19e exceeds a level of approximately one-half the pressure that is present in the line 17h, 18h and 19h, which is at the inlet of the respective control valve, the pilot pressure causes the main control valve to open.

A passageway is provided to one end of the pilot valve, which is the end that will shift the control valve shuttle spool and open it. There is a small filter 17i, 18i and 19i in the passageway and an orifice illustrated generally at 17j, 18j and 19j in the line. Further, the sense lines 17e, 18e and 19e are tapped into the pilot pressure opening of the valve and thus into the pilot pressure line. The sense lines will carry a small flow of air (since they are not dead ended) from the pilot lines in the valves 17c–19c to a port opening to the air assist air outlet lines 17f, 18f and 19f.

Figure 4:
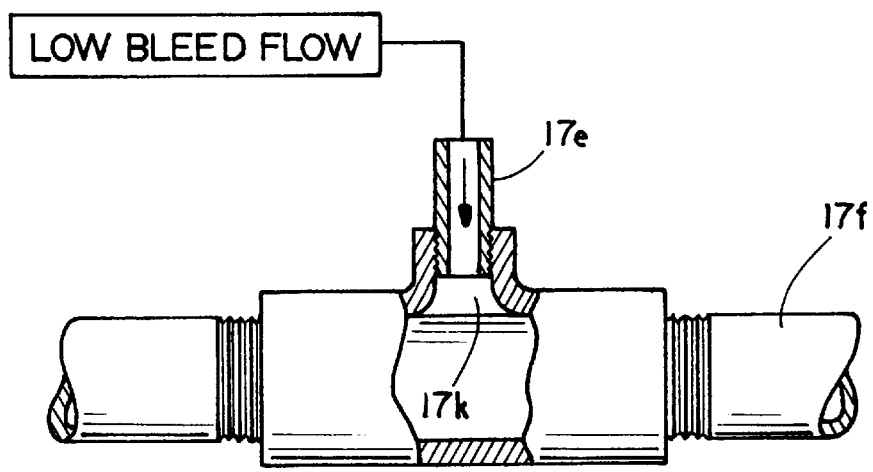
FIG. 4 is a schematic enlarged representation of a typical pilot operated valved used in the device shown in FIG. 2.

Each of the output lines of the valves 17c–19c, which will carry the full flow from lines 17h–19h, 19h when the valves 17c–19c open, has a manual throttle valve 17d–19d that can be adjusted so that a preset flow of air will be provided in the lines 17f–19f when the valves 17c–19c open. The air assist air outlet lines 17f, 18f and 19f as shown open at ports 17g, 18g and 19g that are formed in the wall of the material carrying conduit 3. During normal operation, there thus is a small flow of air as controlled by the orifices 17j–19j from the pilot pressure line of each of the valves 17c–19c (and the other air assist pilot valves as well) and through the sensing lines 17e, 18e and 19e. The pressure sensing opening or ports such as the port 17k shown in FIG. 4 where the sensing line 17e joins the conduit 17f, is maintained free of obstructions by this bleed flow. The port 17k is shown typically, and each sensing line has such a port opening into the respective air assist air outlet line. The bleed flow then also flows out air outlet lines 17f–19f and keeps ports 17g–19g unobstructed.

In FIG. 2 when a blockage or slug 30 comes through the conveying line 3 and is downstream of the orifice of one of the respective valves, such as that shown at 17g, the back pressure in the line 17f will rise, because the air moving the material in conduit 3 will build up in pressure behind the slug shown at 30. This then will cause the pressure in sensing line 17e to rise, and when such pressure exceeds about one-half of the input pressure at line 17h on the output of the pilot operated regulator, the pilot operated valve 17c shifts so that it opens and transmits the air flow from line 17h through the valve 17c, through the throttle valve 17d and into the air assist air outlet line 17f to provide an air assist flow of substantial volume to keep the material, moving toward the receiving bin.

The same action is carried out at each of the air assists that are shown, and the material is kept moving in the conduit 3.

Figure 3:
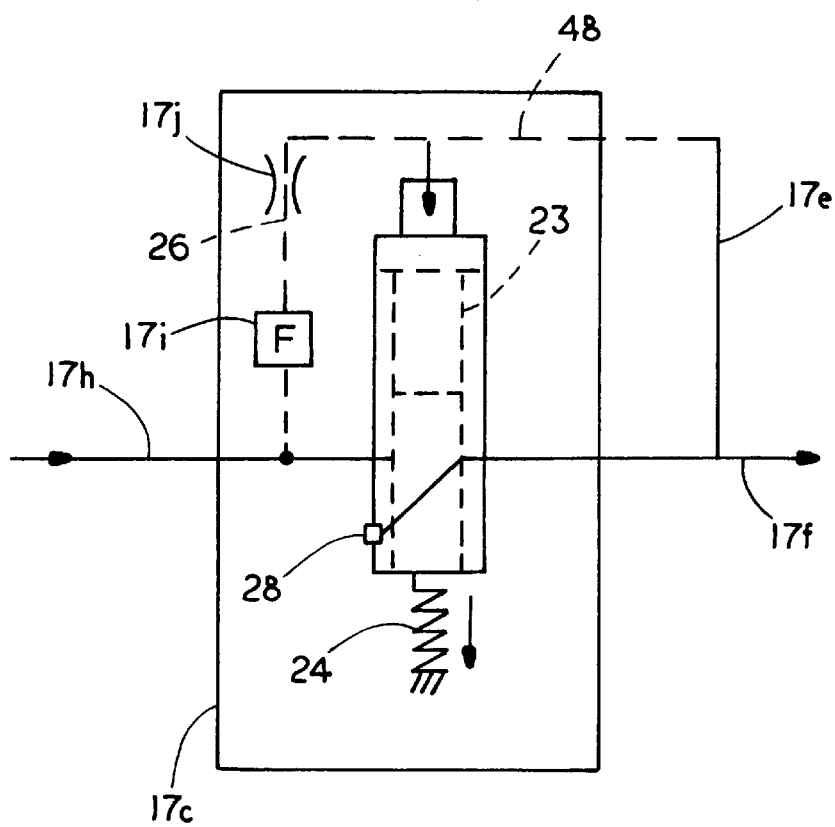
FIG. 3 is an enlarged sectional view of the junction of a pressure sense line and an air assist air outlet line.

In FIG. 3, the pilot valves, such as valve 17c is shown schematically. The shuttle spool is indicated at 23 and the spool is shown retained in normal position with a bias spring force 24. This force can be provided with air pressure. The pilot pressure passageway 26 has the filter 17i and orifice 17j therein. The pilot pressure will, when it reaches the desired level, shift the shuttle spool to its open position. The passageway 26 opens to the pilot pressure sensing port of the valve 17c and is tapped with a line forming the sense line, such as line 17e. The bleed flow is then provided to the air outlet line such as 17f.

The outlet port 28 is blocked so that with the valve in normal position as shown the bleed flow will not escape through the valve. This valve is a standard differential pressure pilot valve with the bleed passage, and the filter and orifice added.

Thus, the concept is to maintain a low bleed flow of air through the sensing lines 17e–19e, and all other sensing lines used for the air assists.

Figure 5:
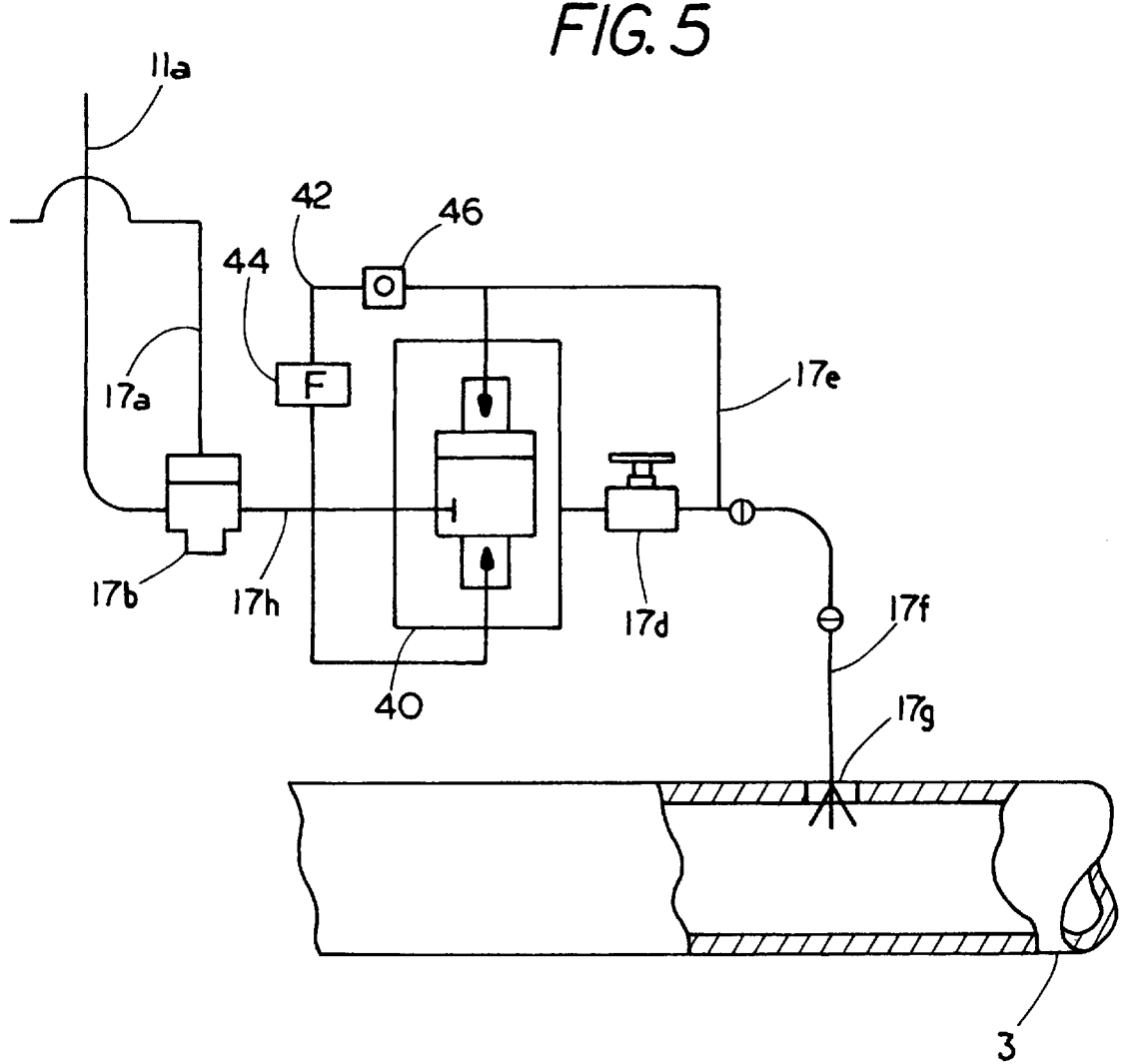
FIG. 5 is a schematic representation of an alternate way of providing a bleed flow of air to the air assists in accordance with the present invention.

An alternative to the arrangement for providing the flow through the sensing lines is shown in FIG. 5. One air assist input line 17f is illustrated in FIG. 5, and leads from the throttle valve 17d, which carries the flow from the pilot operated air assist control valve 40. Sensing line 17e is connected to the line 17f in a conventional manner. Pilot operated valve 40 is a conventional on/off valve so when there is a preselected back pressure in the sensing line 17e which is connected to the pilot pressure sensing port, the valve shown at 40 shifts and turns on flow from line 17h. In this form a tap line shown at 42 is connected to the pilot regulator output line 17h of pilot regulator 17b. A filter 44 is in the tap line 42, followed by an orifice 46, that permits a small flow through a line 48 into the back pressure sensing line 17e. The orifice 46 is selected so the back pressure from the bleed flow itself is kept negligible. The back pressure caused by material in the conveying line 3 operates the pilot valve 40.

This connection could be made on all of the air assists, and provide for a very limited or small flow bleed through the sensing line 17e, line 17f and the port 17g when the unit is first energized and there is air flow in the pilot pressure line 12. This flow keeps the port 17k and the ports and openings for the other lines open.

The main components that are used are essentially the same as those shown in U.S. Pat. No. 5,584,612, except for the bleed air through the air assist air outlet line. The sense line location is also different, however, so that the back pressure that is sensed is at the port from the air assist inlet line where the air assist input line joins the material conveying conduit 3.

The pilot operated valve is a conventional type pilot operated valve that includes the filter and orifice in the pilot pressure line, which pilot pressure line is tapped to provide a small bleed flow of air into the back pressure sensing line and out through the ports where the sensing line joins the air assist input line, and also out of air assist input line port where the input line joins the material conveying conduit.

In summary, the pilot pressure line 12 supplies control air pressure to the transporter 1 and each pilot regulator 13b–19b along the convey line through the pilot air line 13a. Line 12 is pressurized to a predetermined amount each time the transport cycle is initiated. With pressure in the pilot line 12 the pilot operated pressure regulator at each air assist will provide air under regulated pressure to the pilot operated control valves 13c–19c, which stops the flow of air until required by the conveying conduit 3. Note that in FIG. 2 no flow is discharging from line 19f.

The pilot operated control valve allows pressure at the valve "close" pilot end of the valve to bias the valve closed but also passes a small amount of air through a filter and orifice to the "open" pilot end of the valve. The air that passes to the "open" pilot end of the valve connects a low flow from the respective pilot operated valve through the sense lines 13e–19e to the associated air assist input air line downstream of flow control valves 13d–19d. The amount of air passing through the sense lines 13e–19e is not large enough to create a back pressure in the sense lines 13e–19e.

The flow of this small amount of air starts when the pilot pressure line 12 is pressurized. This pressure is supplied to all the pilot pressure regulators at each air assist. As material passes through the conveying line 3 a back pressure is sensed in the sense lines 13e–19e. When the back pressure reaches approximately half the pressure at the inlet of the pilot operated control valve, the pilot operated valve shifts open, allowing air to flow from the output of the pilot operated regulators 13b–19b through the associated pilot operated control valve downstream. The amount of air flow in the air assist air outlet lines 13f–19f is then controlled by the flow control valves 13d–19d. This amount is determined by the material flow characteristics, distance along the conveying line and desired flow of material through the conveying line.

Although the present invention has been described with reference to preferred embodiments, workers skilled in the art will recognize that changes may be made in form and detail without departing from the spirit and scope of the invention.

What is claimed is:

1. A pneumatic transport system for bulk material utilizing dense phase techniques for conveying material in a pneumatic conveying line, the system comprising:

a conveying conduit;

a material transport at an inlet end of the conveying conduit for moving material to be conveyed into the conveying conduit;

a receiver at an outlet end of the conveying conduit, with the conveying conduit being a continuous conveying conduit between the transporter and receiver; and at least one air assist along the conveying conduit, said air assist including a pressure regulating valve to connect it to a source to provide a regulated fluid flow, a pilot operated control valve connected to the output of the regulator and having an air assist gas outlet line connected to an output of the control valve to discharge a gas into the conveying conduit when the pilot operated control valve is open, a pilot pressure sensing line coupled to the pilot operated control valve and connected to the air assist gas outlet line, and a source of a low flow fluid open to the pilot pressure sensing line to provide a continuous flow of fluid into the air assist gas outlet line and the conveying conduit when the transport system is operated, back pressure in the pilot pressure sensing line causing the pilot operated control valve to open.

2. The transport system of claim 1, wherein the source of low flow fluid comprises a flow line connected to a source of fluid under regulated pressure, and a flow controller in said flow line, and the flow line being also coupled to the sensing line.

3. The transport system of claim 2, wherein the flow line is connected to a pilot pressure line of the pilot operated control valve.

4. The transport system of claim 1, wherein the pressure regulating valve is on an input side of the pilot operated control valve, and the source of low flow fluid being open to the output of the pressure regulating valve.

5. The transport system of claim 1, wherein the low flow fluid provides a back pressure substantially less than the pilot pressure needed to operate the pilot operated control valve.

6. An air assist for providing air into a material carrying conduit moving material under pneumatic pressure, the air assist having an air assist air outlet line open through a port to the conduit at a desired location, a control valve for providing a regulated flow of air through the air assist air outlet line in response to sensed back pressure at a pressure control port, a pressure sensing line connected from the pressure control port and to the air assist air outlet line, and a source of a low flow of air to continuously provide flow through a portion of the sensing line and the air assist air outlet line when the conduit is used for conveying material.

7. The air assist of claim 6, wherein said control valve comprises a pilot operated control valve responsive to sensed pressure in the sensing line, and a source of regulated fluid pressure to an inlet side of said pilot operated control valve.

8. A method of maintaining an unobstructed back pressure sensing line in a dense phase material conveying system having a pneumatic material conveying conduit, comprising providing a pilot operated control valve for controlling a flow of regulated air under pressure through an air line into the conduit at a desired location;

providing a back pressure sensing line connected to the air line and coupled to the pilot operated control valve for operating the pilot operated control valve; and providing a low flow of air from a source of air under pressure through a portion of the sensing line and the air line.

9. The method of claim 8 including the step of regulating the low flow of air from the source into the sensing line through a flow control orifice.

10. The method of claim 8 including the step of regulating the pressure to an input of the pilot operated control valve with a pilot operated pressure regulator having an output connected to the input of the pilot operated control valve.

11. The method of claim 8 including providing the source of air pressure to the sensing line by coupling the sensing line to the output of the pilot operated pressure regulator through a flow regulator.

* * * * *

UNITED STATES PATENT AND TRADEMARK OFFICE
CERTIFICATE OF CORRECTION

PATENT NO. : 6,106,202
DATED : August 22, 2000
INVENTOR(S) : Phillip A. Nolan

It is certified that error appears in the above-identified patent and that said Letters Patent is hereby corrected as shown below:

Column 3, line 63, cancel ", 19h", second occurrence.

Signed and Sealed this

Twenty-ninth Day of May, 2001

Attest:

NICHOLAS P. GODICI

*Attesting Officer*    *Acting Director of the United States Patent and Trademark Office*